Patented June 12, 1934

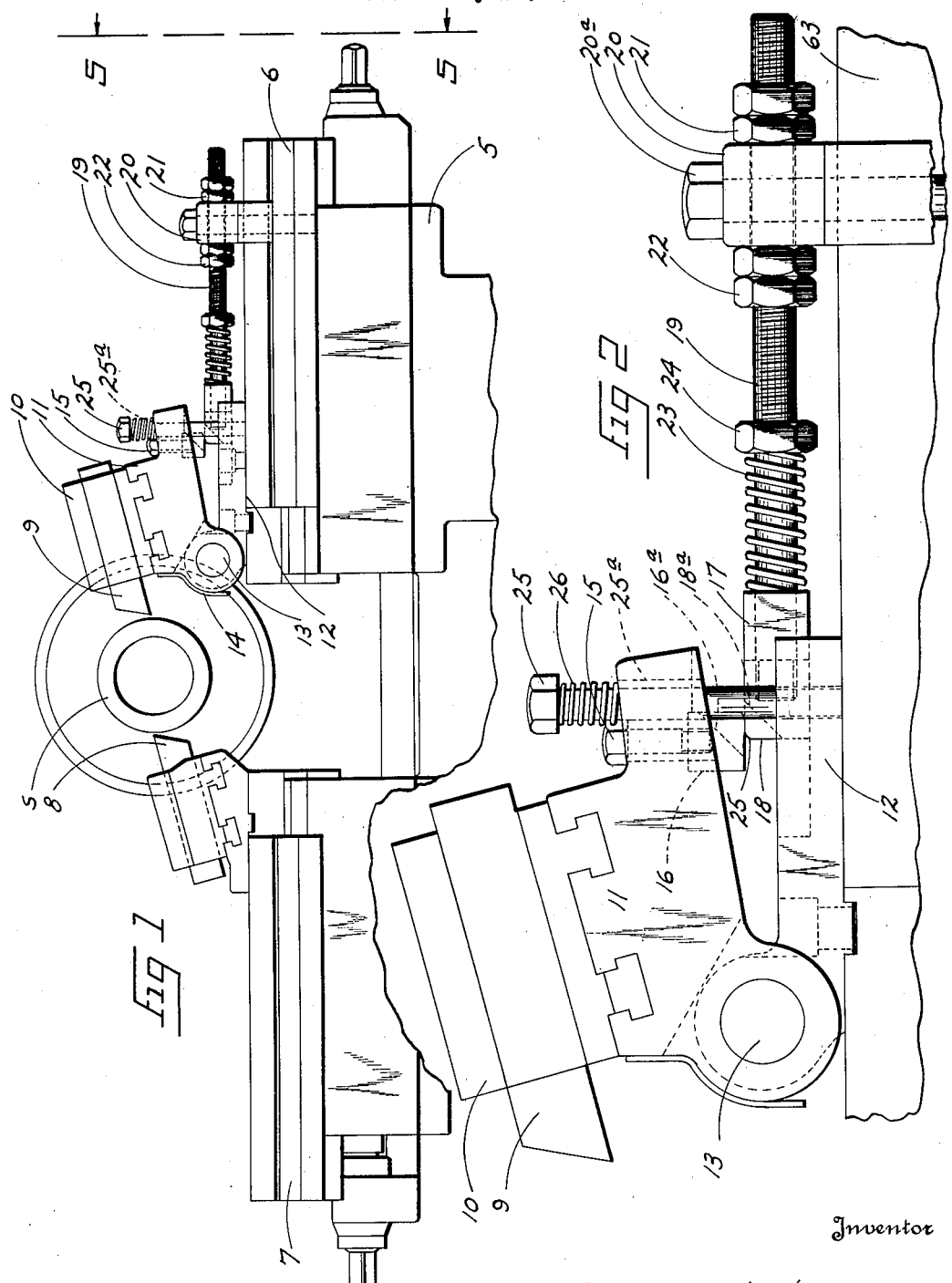

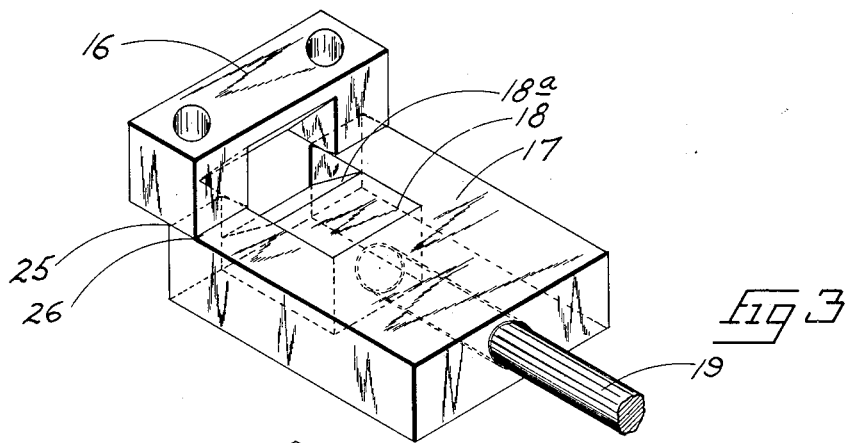
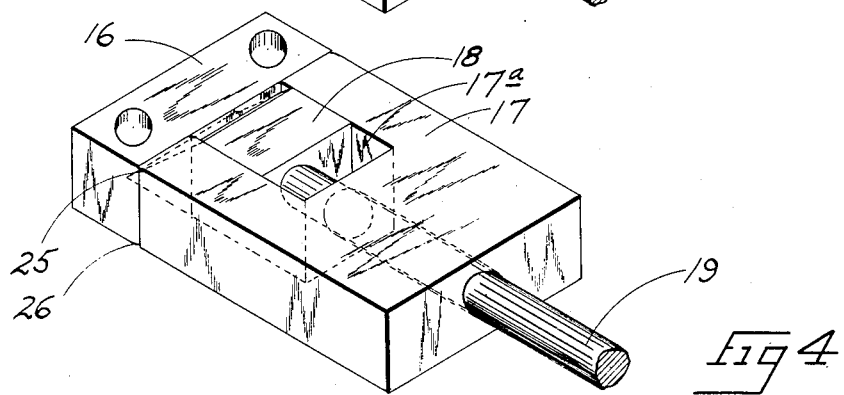
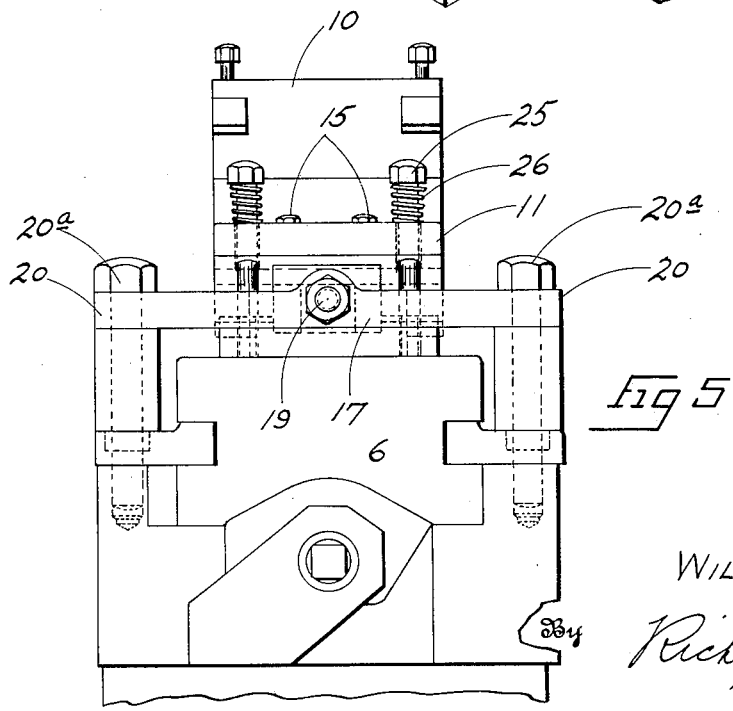

1,963,023

UNITED STATES PATENT OFFICE 1,963,023

AUTOMATIC TOOL

William L. Libby, Cleveland, Ohio, assignor to John G. Oliver, doing business as Bardons & Oliver, Cleveland, Ohio Application July 24, 1931, Serial No. 552,929

14 Claims. (Cl. 82—25)

This invention relates to cutting tools or tool attachments for use in connection with cutting-off lathes and analogous machines, and has for its principal object to improve upon the construction of such tools generally and more particularly tools of the type which automatically move clear of the work at a predetermined time.

Automatic tool holders made in accordance with my invention are particularly adapted to be used with cut-off machines of the general type illustrated in my co-pending United States patent application, Serial No. 547,950, filed June 30, 1931. In this particular type of machine two tools are used, one feeding into the work from the front and the other feeding into the work from the rear. By utilizing my improved tool holder on the rear tool slide and inserting a chamfering tool in the tool holder it is possible to efficiently chamfer or round the edges of the pieces cut off by the front cutting tool simultaneously with the cutting operation.

As my tool holder is adapted to automatically withdraw the tool from the work at any predetermined time, it may be set to withdraw the chamfering tool before the cutting tool completes its cutting action, and thus the danger of imperfect beveling or chamfering due to the piece dropping off before the chamfer cut is completed, is eliminated.

Other objects of my invention are: the provision of an automatic tool attachment for lathes and the like, which is adapted to withdraw the tool from the work at any pre-determined time and to be reset to cutting position by the backward movement of the tool slide of the machine; the provision of an automatic tool having a minimum number of moving parts and which is particularly susceptible to economical manufacture; the provision of an automatic tool of the class described which may be quickly and accurately adjusted to perform cutting operations of any desired depth independently of the movement of the tool slide of the machine to which it is attached.

The above and other objects of my invention will appear from the following description of a preferred form thereof, reference being had to the accompanying drawings, wherein:—

Figure 1 is a view in elevation of the tool slides and tools of a cutting-off machine, showing one embodiment of my invention applied to a chamfering tool on the right-hand or rear tool slide;

Fig. 2 is an enlarged view of the right-hand tool slide of Fig. 1;

Figs. 3 and 4 are detail views in perspective of parts of the assembly shown in Figs. 1 and 2; and Fig. 5 is a view in end elevation as indicated by the line 5—5, Fig. 1.

As shown in Fig. 1, the improved tool holder is illustrated equipped with a chamfering tool 60 which is used on a cutting-off machine in conjunction with a cutting tool. It will be seen by those skilled in the art that the invention could be applied equally well to both tools or to other types of cutting, threading, or like tools. When used as shown, the chamfering tool assembly may be adjusted so that the chamfering tool will complete its chamfering operation and withdraw from the work before the cutting-off tool completes the cutting-off operation, thus preventing any possible damage to the tools and imperfect chamfering due to the chamfer tool cutting or being in contact with the work when it is about to break off and when the stock is weak.

Referring now particularly to Figs. 1 and 2, the numeral 5 designates the base of the machine, having right and left hand tool slides 6 and 7 mounted thereon. These tool slides may be operated in any desired manner, although as will hereinafter appear, one of the advantages of the present improved tool is its adaptability to a fluid pressure actuated type of feed. The cutting-off tool is indicated at 8 and the chamfering tool at 9. The stock is adapted to be cut off by the tool 8, while the tool 9 acts to chamfer the ends of the stock cut off by the cutting tool. While, as above noted, the invention could equally well be applied to the tool 8, to simplify the description and showing, it is illustrated as being applied only to the chamfering tool 9. The chamfering tool 9 is fixed in a holder 10, which is adjustably secured to a block 11, pivotally secured to a base member 12 by a pin 13, a guard 14 preferably being provided to prevent extraneous matter from interfering with the hinged joint between said block and base. The base 12 is secured to the tool slide 6 and moves therewith during its inward feeding stroke and outward return stroke.

Secured to the block 11, by means of bolts 15, is a cam block 16 having an under surface which lies in a plane substantially parallel to the plane of feed and a beveled, centrally located face portion 16a disposed at an angle to said plane. This block 16 co-acts with a complementary U-shaped cam block member 17 formed with a cut-out portion or guideway 17a and mounted to have a limited sliding fit in the base 12, and a relatively stationary cam block 18 (Figs. 3 and 4), having a beveled face 18a adapted to co-act with the beveled portion 16a of the block 16. The U-shaped member 17 has a sliding engagement with block 18 and the latter block is secured to the end of a fixed rod 19 which projects through a bore in said member 17. The opposite end of said rod is adjustably secured to a yoke 20, which is fixed to a stationary part of the machine, such as the base 5, by means of bolts 20a. The rod 19 may be adjusted by means of lock nuts 21 and 22. A compression spring 23 normally urges the U-shaped block 17 against the fixed block 18, said spring being adjusted by means of a nut 24. The pivoted support 11 is formed with slotted openings 25a through which project bolts 25, provided with compression springs 26, which normally urge the block downwardly toward the base 12.

It will thus be seen that the pivoted support or block 11, which carries the tool 9 and tool holder 10, is pivotally secured at one extremity to the base 12 which, in turn, is secured to and moves with the tool slide 6. At its opposite extremity said block has secured thereto the block 16, the blocks 11 and 16 being permitted a limited rocking or arcuate movement by the bolts 25. The springs 26 normally urge said blocks toward said base, while the U-shaped member or block 17 is permitted to have a limited sliding movement in the base 12 and also on the adjustable rod 19. On one end of rod 19 the beveled block 18 is secured and the spring 23 normally urges the block 17 against the block 18.

It is preferred to slightly bevel the co-acting corners of the blocks 16 and 17 to give said corners what is commonly known as a self-locking angle (approximately 15 degrees), as indicated at 25' and 26', for a purpose which will presently be made apparent.

In operation, at the beginning of the inward feeding stroke of the tool slide 6 and consequently of the base member 12 which is secured thereto, the parts will be in position as shown in Figs. 1 and 2, with the flat bottom face of the block 16 sliding over the flat top face of the U-shaped member or block 17. The tool 9, during this movement, engages the work and completes the chamfering, or other cutting operation. As the tool slide continues to feed inwardly the block 16 slides off of the member or block 17 approximately at the completion of the chamfering operation, or at the desired adjusted point, and the spring 26 pushes down upon the hinge block 11, forcing the block 16 down against the base member 12 and throwing the cutting end of the tool upwardly and out of cutting contact with the work. During the feed stroke of the assembly, the U-shaped member 17 remains relatively stationary due to the fact that it is held against inward movement by the block 18. On the return stroke, however, the U-shaped member 17 is pushed backwardly against the tension of the spring 23 by the block 16 until the beveled face 16a of the latter block engages the co-acting face 18a of the block 18, whereupon the block 16 rides up on the block 17 and the pivoted tool supporting block 11 is elevated to the position shown in Figs. 1 and 2. This action throws the tool 9 back into cutting position relative to the center line of the work.

By beveling the corners 25 and 26 of the co-acting blocks 16 and 17, as above noted, the retraction of the tool from the work will be less abrupt, so that a smoother chamfering surface or cut will result.

The ease and accuracy of adjustment of the tool retracting operation will be clearly seen from the above description. This renders my improved tool assembly particularly adaptable for fluid-operated tool slides and other machines wherein an accurate adjustment is important. The exact point of retraction of the tool from the work is preferably adjusted independently of the tool slide by means of the nuts 21 and 22, although other methods may be adopted. For instance, by adjusting the nuts 21 so that the block 17 will move inwardly a certain predetermined distance with the slide, the feed stroke of the tool 9 may be adjusted independently of its return stroke, and this adjustment may be made without altering the relative positions of the co-acting blocks 16, 17 and 18. There is no necessity for adjusting the tool slide, as the assembly may be set to retract the tool from the work after any desired depth of cut simply by adjusting the nuts 21 and 22.

Although I have illustrated and described a preferred form of my automatic tool holder in some detail, it will be seen by those skilled in the art that modifications and variations therein may be made without departing from the spirit of my invention. I do not therefore wish to be limited to the precise details shown and described but claim as my invention all embodiments thereof coming within the scope of the appended claims.

Having thus described my invention, what I claim is:

1. A tool assembly of the class specified comprising a tool slide, a tool support pivotally mounted on said slide, a tool in said support, means for reciprocating said support on said slide and means for raising and lowering said tool to bring it into working position and retract it clear of the work comprising a block secured to said support and provided with cam surfaces arranged in a substantially parallel plane to the plane of feed and at an angle to said plane, a co-acting resiliently mounted block member having a cam surface also lying in a substantially parallel plane to the plane of feed, and a further block member held stationary with respect to the remaining block members and formed with a cam surface substantially parallel to the angular surface of said first-named block member, said cam surfaces being brought into engagement through reciprocation of said support.

2. A tool assembly of the class specified, comprising a tool slide, a tool support mounted to reciprocate with said slide, a tool carried by said support, and means for raising and lowering said tool comprising co-acting block members, one of said block members being secured to said support and another of said members being formed with a guideway, and a relatively stationary co-acting block member held stationary in said guideway and having a beveled face adapted to engage the co-operating beveled face of the block member secured to said support.

3. In a tool assembly of the class specified, a tool, means for feeding said tool into and retracting the tool from the work, and means for raising and lowering said tool including a relatively stationary rod, a U-shaped block member mounted to slide on said rod, a block member having a beveled face secured to the end of said rod, and a further block member co-acting with said first named block member mounted to move with said tool, said last named block member being adapted to ride on said U-shaped member and having a beveled face adapted to co-operate with the block member secured on said rod.

4. A tool assembly of the class specified comprising a tool, a pivotally mounted tool holder, means for reciprocating said tool to feed it toward and withdraw it from the work, and means for rocking said holder to retract the tool from the work independently of its reciprocatory movement, said means including contacting cam blocks which slide one upon the other and are formed with beveled co-acting corners to check the abruptness of the retraction movement when one block moves clear of the other.

5. A tool assembly of the class specified, comprising a tool, a support for said tool, means for reciprocating said support, and means for raising and lowering said support to move the tool into cutting position and retract it from the work, said means including relatively movable co-acting block members formed with edges which are beveled on a self-locking angle to check the abruptness of the retraction movement of the tool.

6. In a tool assembly of the class specified, a tool, a support for said tool, means for reciprocating said support, a rod secured in a relatively stationary position with respect to said tool, a block member secured on one extremity of said rod and having a beveled working face, a second block member mounted for movement relative to said rod and first named block member, and a third block member secured to said tool support and formed with working surfaces lying parallel to and adapted to slide upon the surfaces of said first and second named block members.

7. In a machine of the class specified, a reciprocating tool slide, a pivotally-mounted tool holder adapted to reciprocate with said slide, a tool in said holder, co-acting relatively movable cam blocks for moving said holder about its pivot to retract the tool clear of the work, one of said blocks being carried by said holder and adapted to ride on the other block for a predetermined forward travel of said holder and while so traveling holding the tool in a position to operate on the work and means for adjusting the position of one of said blocks whereby the portion of the forward stroke of the tool slide during which the tool engages the work may be adjusted independently of the length of said forward stroke.

8. In a machine of the class specified, a reciprocating tool slide, a pivotally-mounted tool holder adapted to reciprocate with said slide, a tool in said holder, and means for moving said holder about its pivot to move the tool into working position and retract it clear of work comprising, a cam block carried by said holder and having a surface lying in a plane substantially parallel to the path of travel of said slide and a beveled surface, another cam block held stationary with respect to said holder and having a beveled cam surface adapted to co-act with the beveled surface of said first-named block and move the tool into working position, and a resiliently mounted block formed with a cam surface adapted to co-act with the surface of said first-named block which lies in the plane substantially parallel to the path of travel of said slide to hold the tool in a position to operate on the work during a predetermined forward travel of said holder.

9. In a machine of the class specified, a reciprocating tool slide, a pivotally-mounted tool holder adapted to reciprocate with said slide, a tool in said holder, co-acting cam blocks for moving said holder about its pivot to move the tool clear of work, one of said blocks being carried by said holder and adapted to engage the other block for a predetermined forward travel of the holder and while so engaged holding the tool in a cutting position with respect to the work, and means for adjusting the position of said last-named block to thereby adjust the depth of cut of said tool independently of the length of stroke of said holder.

10. In a machine of the class specified, a reciprocating tool slide, a pivotally-mounted tool holder adapted to reciprocate with said slide, a tool in said holder, means for reciprocating said holder to thereby advance and retract the tool relatively to work, means for maintaining said holder and tool in a position to operate on the work during the advancing movement of said holder, and means for moving said holder about its pivot to move the tool clear of the work comprising a cam block carried by said holder and provided with a beveled surface, and a relatively stationary cam block adapted to engage said cam block on said holder during a portion only of the advancing movement of the holder, said stationary cam block being adjustably mounted in the path of movement of said first-named cam block.

11. In a machine of the class specified, a reciprocating tool slide, a pivotally-mounted tool holder adapted to reciprocate with said slide, a tool in said holder, means for maintaining said holder and tool in cutting position during advancing movement of said holder, and means for initiating movement of said holder about its pivot to move the tool out of cutting position comprising a cam block associated with said holder, a relatively stationary co-acting cam block mounted in the path of movement of said first-named cam block, and means for adjusting the position of said relatively stationary block to thereby adjust the point in the advancing movement of the holder at which the tool is moved out of cutting position independently of the reciprocatory travel of said holder.

12. In apparatus of the class described, a tool slide, a tool pivotally supported on said slide and means for maintaining said tool in cutting position during forward movement of said slide, swinging said tool about its pivot out of cutting position and then, during return movement of said slide, returning said tool to cutting position, said means including a cam block movable with said tool, a second cam block stationary with respect to said tool and adapted to engage said first named cam block and return the tool to cutting position during return movement of the slide, a third cam block positioned to engage said first named block and maintain the tool in cutting position during at least a portion of the forward movement of the slide, and means for adjusting the position of said second and third cam blocks whereby the point in the forward tool slide travel at which the tool is moved about its pivot out of cutting position may be controlled.

13. In a machine tool a reciprocating tool slide, a pivotally mounted tool holder adapted to reciprocate with said slide, a tool in said holder, co-acting relatively movable cam blocks for moving said holder about its pivot to retract the tool clear of the work, one of said blocks being carried by said holder and adapted to ride on the other block for a predetermined portion of the forward travel of said holder and while so traveling to hold the tool in a position to operate on the work, means for adjusting the position of one of said blocks whereby the portion of the forward stroke of the tool slide during which the tool engages the work may be adjusted independently of the length of said forward stroke and means, including a third cam block, for moving said tool holder about its pivot to return said tool into work engaging position during the return movement of said tool holder.

14. In a machine of the class specified, a reciprocating tool slide, a pivotally mounted tool holder adapted to reciprocate with said slide, a tool in said holder, means for reciprocating said holder to thereby advance and retract the tool relatively to work, means for maintaining said holder and tool in position to operate on the work during the advancing movement of said holder, and means for moving said holder about its pivot to move the tool clear of the work comprising a cam block carried by said holder and provided with a beveled surface, and a relatively stationary cam block adapted to engage said cam block on said holder during a portion only of the advancing movement of the holder, said stationary cam block being adjustably and resiliently mounted in the path of movement of said first-named cam block.

WILLIAM L. LIBBY.